(12) United States Patent
Vaish et al.

(10) Patent No.: US 8,438,640 B1
(45) Date of Patent: May 7, 2013

(54) METHOD AND APPARATUS FOR REVERSE PATCHING OF APPLICATION PROGRAMMING INTERFACE CALLS IN A SANDBOX ENVIRONMENT

(75) Inventors: Aditya Vaish, Rajasthan (IN); Sushil Kumar, Punjab (IN); Gaurav Gupta, Parwanoo (IN)

(73) Assignee: Adobe Systems Incorporated, San Jose, CA (US)

( * ) Notice: Subject to any disclaimer, the term of this patent is extended or adjusted under 35 U.S.C. 154(b) by 211 days.

(21) Appl. No.: 12/974,934

(22) Filed: Dec. 21, 2010

(51) Int. Cl.
*G06F 11/00* (2006.01)
(52) U.S. Cl.
USPC .......................................... 726/22; 713/189
(58) Field of Classification Search .................. 726/22; 713/189
See application file for complete search history.

(56) References Cited

U.S. PATENT DOCUMENTS

| 5,974,549 | A | 10/1999 | Golan | |
|---|---|---|---|---|
| 2008/0016339 | A1 | 1/2008 | Shukla | |
| 2010/0031361 | A1* | 2/2010 | Shukla | 726/24 |
| 2010/0057774 | A1* | 3/2010 | Pizano et al. | 707/103 R |
| 2010/0107088 | A1* | 4/2010 | Hunt et al. | 715/752 |

FOREIGN PATENT DOCUMENTS
WO WO 2009/088685 A1 8/2009

OTHER PUBLICATIONS

"Tailoring Java for a Pervasive Service Infrastructure", Philippe Bernadat, Ira Greenberg, Alan Messer, Dejan Milojicic, Mobile Systems and Services Laboratory, HP Laboratories Palo Alto, HPL-2002-24, Jan. 31, 2002, 13 pages.

* cited by examiner

*Primary Examiner* — Christopher Brown
(74) *Attorney, Agent, or Firm* — Moser Taboada

(57) ABSTRACT

A computer implemented method comprising: identifying an API function call directed to a broker process, wherein a plurality of information requested by an originator is directly relevant to a sandbox process; trapping an API function call directed to a broker process using a computer, wherein the API function call references the broker process, wherein the broker process is a process that executes one or more operations on the behalf of a sandbox process, and wherein the sandbox process has an insufficient permission level to execute the one or more operations; passing the trapped API function call to the sandbox process using the computer; executing the trapped API function call within the sandbox process to generate a result in reference to the sandbox process using the computer; passing the result from the sandbox process to the broker process using the computer; and passing the result from the broker process to an originator using the computer.

20 Claims, 4 Drawing Sheets

METHOD AND APPARATUS FOR REVERSE PATCHING OF APPLICATION PROGRAMMING INTERFACE CALLS IN A SANDBOX ENVIRONMENT

BACKGROUND

1. Field of the Invention

Embodiments generally relate to a method and apparatus for implementing a sandbox architecture and, more particularly, to a method and apparatus for reverse patching of application programming interface (API) calls in a sandbox environment.

2. Description of the Related Art

There is an increasing need for computer applications to provide more and more features to today's user. Applications are often expected to interact with a variety of content including locally hosted content, remotely hosted content, and a variety of different file types, extensions, and formats. In order to provide these and other features, applications have become more and more complex, with larger and large code bases. Such code bases result in an increased burden on the programmer to eliminate potential security risks to prevent malicious users from unauthorized access.

One method of providing such an application while minimizing the risk of unauthorized access is to execute the application in a reduced privilege environment, a so-called "sandbox." When executed in a sandbox, the application is unable to interact with secure system resources that exist outside the sandbox. As such, the sandbox dramatically reduces the impact of a potential security breach. However, many applications require access to resources outside the sandbox to execute properly. One method of allowing controlled access to these external resources is via a "broker process." A broker process is an element of the application that exists in a higher privilege state to facilitate the operation of particular functions of the application. In other words, the broker process exists outside the sandbox. The broker process typically has a smaller code base than the application and the broker has been thoroughly tested for security breaches. However, performing operations through the broker process has disadvantages, particularly when accessing system application programming interface (API) function calls. Therefore, there is a need in the art for an improved method and apparatus for executing API calls for applications existing within a sandbox environment.

SUMMARY

Embodiments include a computer implemented method and apparatus for implementing reverse patching of API calls in a sandbox environment. In one embodiment, a computer implemented method for implementing reverse patching of API calls in a sandbox environment includes trapping an API function call from an originator using a computer wherein the API function call references a broker process. The method passes the trapped API function call to a sandbox process using the computer. The sandbox process executes the trapped API function call with reference to the sandbox process to generate a result in reference to the sandbox process. The method then passes the result from the sandbox process to the broker process using the computer and, ultimately, passes the result from the broker process to the originator.

Figure 1:
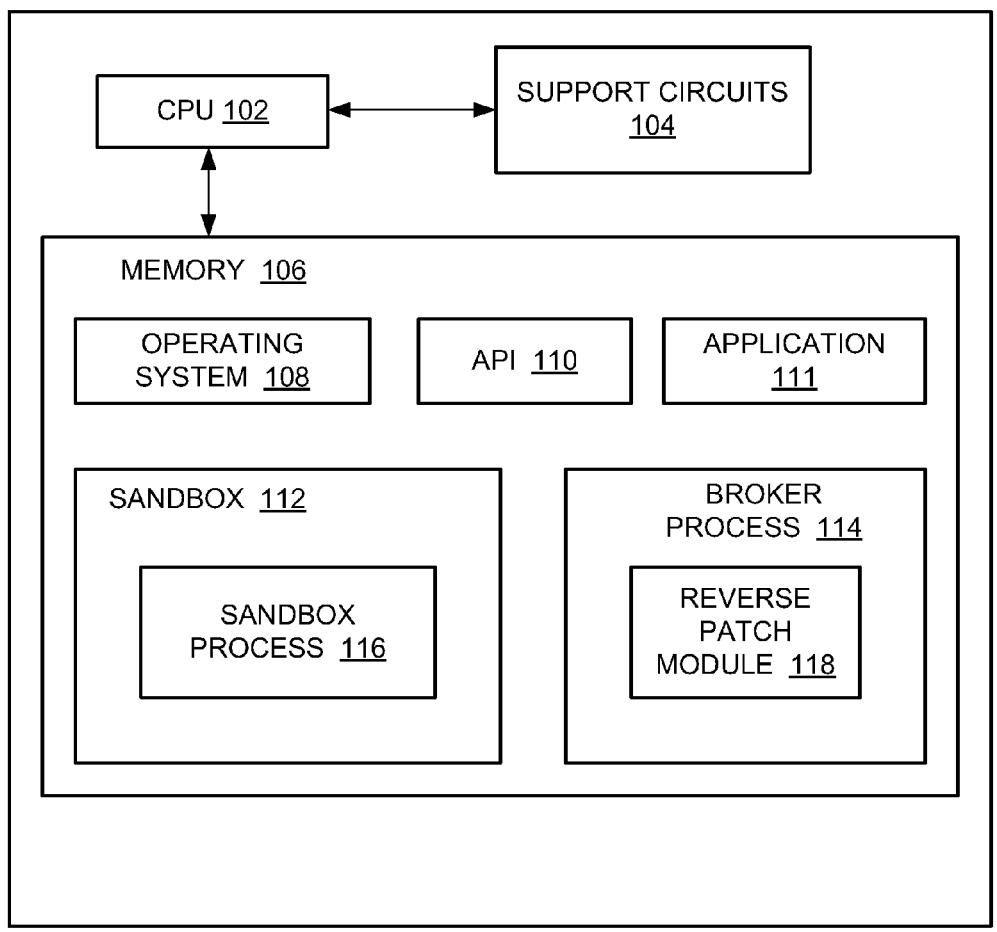
FIG. 1 is a simplified block diagram of a computer system for implementing reverse patching of API calls in a sandbox environment according to one or more embodiments.

While the method and apparatus for implementing reverse patching of API calls in a sandbox environment described herein by way of example for several embodiments and illustrative drawings, those skilled in the art will recognize that the method and apparatus for implementing reverse patching of API calls in a sandbox environment are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for implementing reverse patching of API calls in a sandbox environment as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In brief, embodiments of the invention provide for a method and apparatus for providing for reverse patching of API calls in a sandbox environment. Computer applications typically are associated with a particular level of privilege. This privilege level determines the level of access the applications have to various system hardware and software resources. The "principle of least privilege" is a security concept that states that computer software applications should have no more access to system resources than needed to perform tasks associated with the execution of the applications. One method of enabling such least privilege access is to execute an application within a sandbox.

The concept of a sandbox generally refers to an execution environment where a given application has limited privileges to access system resources. The application can thus only access resources present within its "sandbox". As such, if a malicious user was to gain access to the application, the malicious user would only be able to interact with resources within the sandbox, thus protecting the rest of the computer system from harm.

However, applications that execute within a sandbox environment may require access to resources located external to the sandbox. To deal with this issue, software developers have come up with the concept of a "broker" process. A broker process operates in conjunction with a sandbox process to enable the sandbox process to access resources external to the sandbox. The broker process is typically a highly secure code base, designed to resist intrusion by a malicious user. The broker process thus acts as the "face" of the sandbox process to the rest of the computer system. Unfortunately, this fact causes API calls intended for the sandbox process to be executed with reference to the broker process, instead. The instant invention thus provides a method and system for returning proper results for these incorrectly addressed API calls.

Embodiments of the invention operate by trapping API function calls made with reference to the broker process. These API function calls typically are actually intended for the sandbox process, but are called with respect to the broker process. The broker process passes the trapped API function calls to the sandbox process. The sandbox process then executes the trapped API function call with respect to itself, the sandbox process. After receiving the result of the executed API function call, the sandbox process passes the result back to the broker process. The broker process then returns the result received from the sandbox process as if the broker process had executed the API function call.

Various embodiments of a method and apparatus for implementing reverse patching of API calls in a sandbox environment are disclosed herein. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated or transformed. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining," "identifying," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. The terms "processes," and "applications" refer to instances of computer programs. One of ordinary skill in the art would recognize that a single application might be made of multiple processes. When an application is executed, the execution path becomes one or more corresponding processes executed by the processor in conjunction with the operating system.

Figure 4:
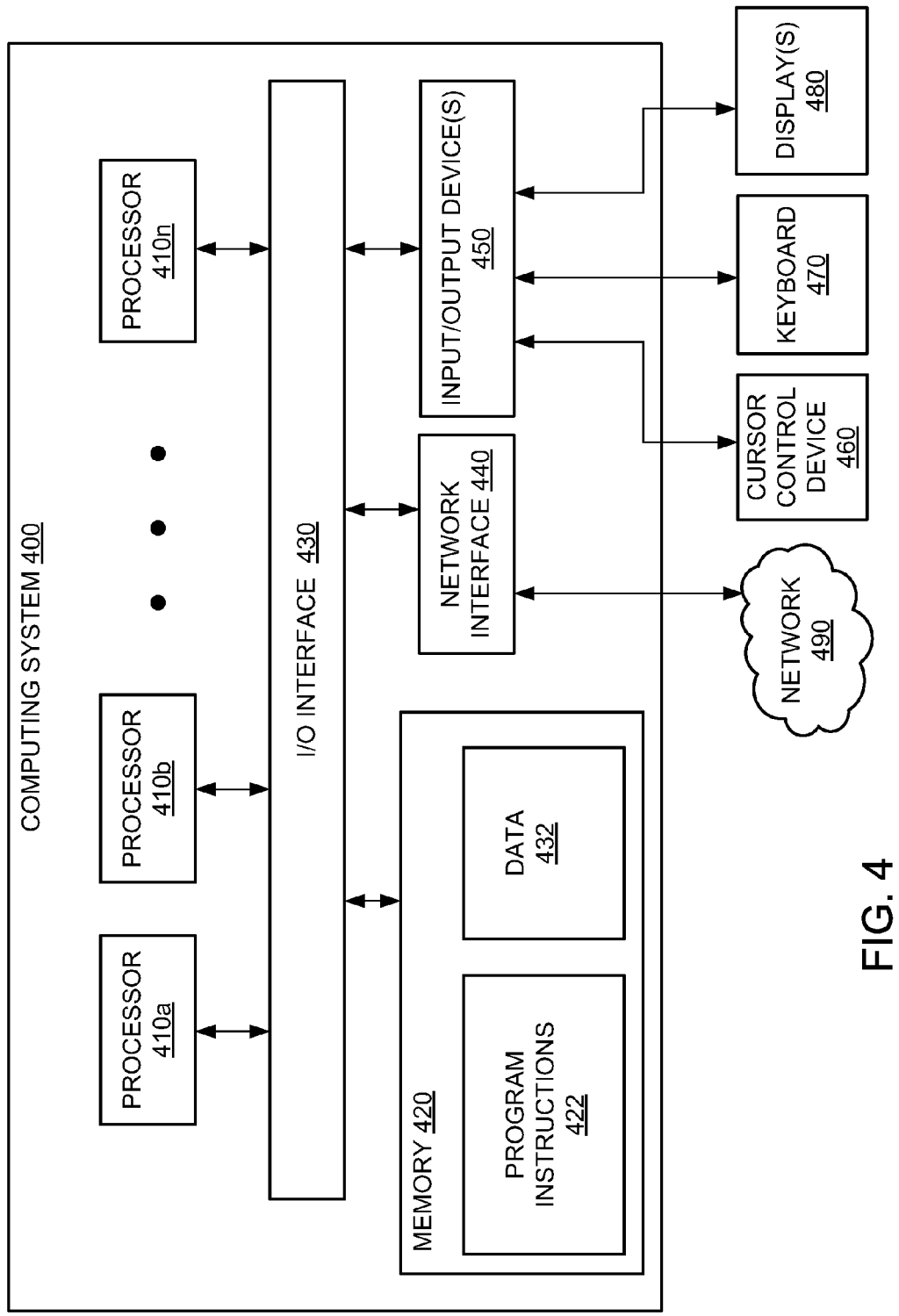
FIG. 4 is a detailed block diagram of an exemplary computer system, such as the computer system described with respect to FIG. 1, according to one or more embodiments.

FIG. 1 is a simplified block diagram of a computer system 100 for implementing reverse patching of API calls in a sandbox environment. One embodiment of a computer system used to implement the various embodiments of the invention is described in detail with respect to FIG. 4. The computer system 100 includes a central processing unit 102, a plurality of support circuits 104 and a memory 106. The support circuits 104 may include a display device as well as other circuits to support the functionality of the CPU 102. Such circuits may include clock circuits, cache, power supplies, network cards, video circuits and the like.

The memory 106 may comprise read only memory, random access memory, removable memory, disk drives, optical drives and/or other forms of digital storage. The memory 106 is configured to store an operating system 108, an application programming interface 110, one or more applications 111, a sandbox 112, and a broker process 114. The operating system 108 executes to control the general operation of the computer system 100, including facilitating the execution of various processes, applications, and modules to perform specific tasks. Examples of operating systems 108 include MICROSOFT WINDOWS, UNIX, LINUX, APPLE OS X, and the like. The one or more applications 111 are computer software programs as commonly known in the art for programming the computer system 110 to perform various tasks. The one or more applications 111 are commonly represented by one or more processes managed by the operating system. The one or more applications 111 may exist in memory in volatile and/or non-volatile storage, and become processes when executed.

The API 110 provides an interface for the applications to access operating system calls and functionality in a consistent and secure manner. The API 110 is a particular set of rules and specifications that a software program can follow to access and make use of the services and resources provided by another particular software program that implements that API. The API 110 serves as an interface between different software programs and facilitates their interaction, similar to the way the user interface facilitates interaction between humans and computers. The API 110 can be created for applications, libraries, operating systems, etc, as a way to define their "vocabularies" and resources request conventions (e.g. function calling conventions). The API 110 may include specifications for routines, data structures, object classes, and protocols used to communicate between the consumer program and the implementer program of the API 110.

The API 110 may be provided as one or more libraries The API 110 may be associated with the particular operating system 108, such as the WINDOWS API, or the API 110 may be associated with one or more of the applications 111 executing on the computer 100. Exemplary APIs include the WINDOWS API, OPENGL, the JAVA APIs, MICROSOFT DIRECTX, APPLE CARBON, APPLE COCOA, and the like.

The sandbox 112 provides a secure environment for execution of the sandbox process 116. A sandbox 112 is a security mechanism for separating running programs, such as the sandbox process 116 from core operating system functionality. "Sandboxing" is a technique for creating a confined execution environment for running untrusted programs. Sandboxing leverages the operating system's security controls under a "principle of least privileges," (i.e. a program should not have higher privileges than necessary), Processes which could be subject to an attacker's control run with limited capabilities and must perform actions such as reading and writing through a separate, trusted process. Sandboxes, such as the sandbox 112 are often used to execute untested code, or untrusted programs from unverified third-parties, suppliers and untrusted users. The sandbox 112 typically provides a tightly-controlled set of resources for guest programs to run in, such as scratch space on disk and memory. Network access, the ability to inspect the host system or read from input devices are usually disallowed or heavily restricted. Examples of sandboxes include applets that execute in a virtual machine or scripting language interpreter, such as ADOBE FLASH, JAVA APPLETS, and MICROSOFT SILVERLIGHT, virtual machines that emulate a host computer, pastebins that allow a user to execute snippets of code, "jails" (e.g. a set of resource limits imposed by an operating system kernel), and the like. Although the sandbox 112 has been primarily described with respect to a software implementation, one of ordinary skill in the art would recognize that various implementations of a sandbox might also include one or more hardware components, such as one or more processors with data execution protection capability, "sandbox" memory for executing virtual machines, and various other solutions using software, hardware, and combinations thereof.

Executing within the sandbox 112 allows the sandbox process 116 to function with a lower level of permissions and rights with respect to various system resources. Executing in this manner limits the damage that a malicious user can do to the computer system 100 in the event they gain access to the sandbox process 116.

The broker process 114 executes outside of the sandbox 112 and has a higher level of access rights and permissions than the sandbox process 116. The broker process 114 is used to perform some action outside of the sandbox boundary on behalf of the sandbox process 116. For example, the sandbox process 116 may wish to perform a file input/output (I/O) operation that requires access to resources outside of the sandbox 112. The broker process 114 facilitates this operation by performing the file I/O operation on behalf of the sandbox process 116. The broker process 114 typically has a smaller, more secure code base than that of the sandbox process. The sandbox process 116 sends and receives data to the broker process 114 via a shared pipe, a shared memory, or another method of interprocess communication as known in the art. The broker process 114 further comprises a reverse patch module 118 for performing reverse patching of API calls in a sandbox environment from the broker process to the sandbox process 116. The method by which the reverse patch module 118 performs this process is described further with respect to FIG. 3.

Embodiments of the invention operate by trapping API function calls made with reference to the broker process 114. These API function calls typically are actually intended for the sandbox process 116, but are called with respect to the broker process 114 since the broker process 114 is the "face" of the sandbox process 116 to the other applications 111 executing on the computer 100. The broker process 114 passes the trapped API function calls to the sandbox process 116. The sandbox process 116 then executes the trapped API function call with respect to itself, the sandbox process 116. After receiving the result of the executed API function call, the sandbox process 116 passes the result back to the broker process 114. The broker process 114 then returns the result received from the sandbox process 116 as if the broker process 114 had executed the API function call.

As an example of the type of problem associated with executing API calls with respect to a broker process, consider the following example of a Mail API (MAPI) session. The sandbox process 116 may wish to create a Mail API (MAPI) session. The invocation of a MAPI session typically requires a higher permission level, which would therefore be handled by the broker process 114. The sandbox process 116 would then instruct the broker process 114 to initiate a Mail API (MAPI) session by invoking the proper system API call. In response to invoking this API call, the MAPI session would then be associated with the broker process, such that future MAPI calls regarding the generation of a user interface would be associated with the broker process instead of the sandbox process, even though the application interface window is associated with the sandbox process, not the broker process. As such, without the reverse patching method described above, future calls relating to interface elements associated with the MAPI session would fail, as they would return values associated with the broker process 114 rather than the sandbox process 116.

As a further example using the MAPI, an OpenMsgStore function called in response to a request to send an email might internally call a GetActiveWindow function. Since the broker process 114 does not have an associated window, the GetActiveWindow function would return a NULL value. The NULL value will then result in a failure to associate the OpenMsgStore function with the proper interface window for the sandbox process 116.

Figure 2:
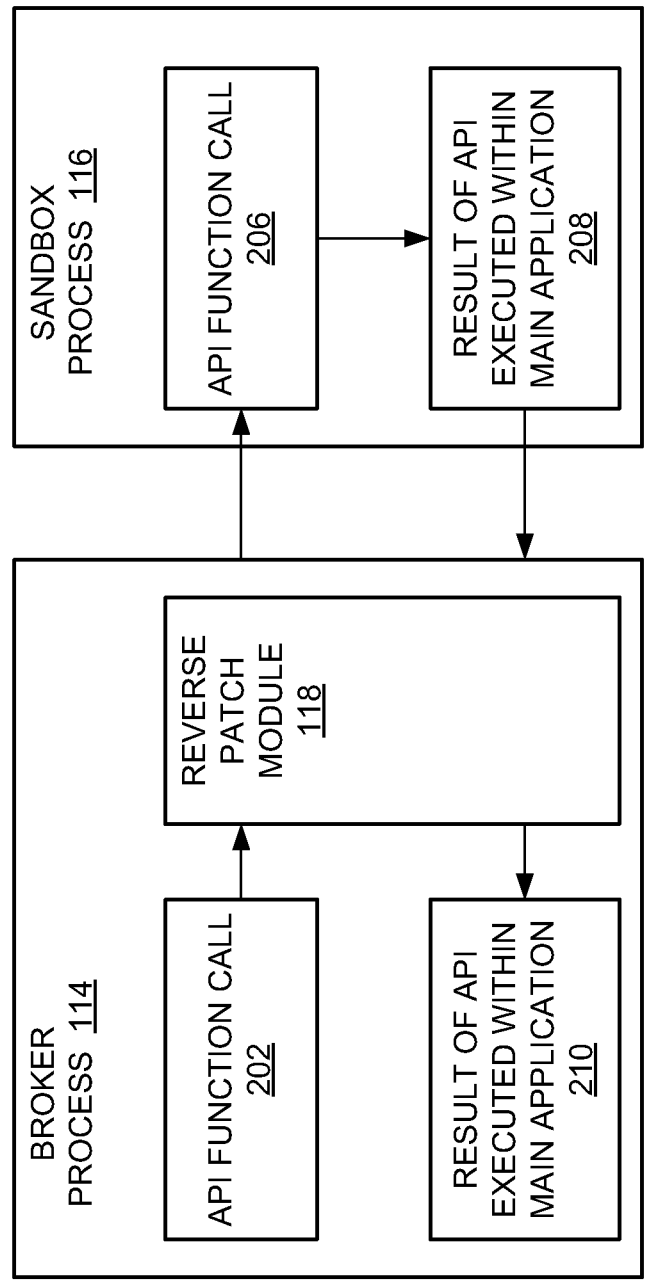
FIG. 2 is a functional diagram depicting a flow of an API call executed via a reverse patch mechanism for a sandbox environment such as the computer system depicted in FIG. 1 according to one or more embodiments.

FIG. 2 is a functional diagram depicting a reverse patch applied to an API function call in accordance with embodiments of the present invention. The reverse patch as applied in FIG. 2 is directed towards a computer system executing a reverse patch module, such as the computer system 100 described with respect to FIG. 1. The functional diagram begins when an API function call 202 is made. The API function call 202 is executed with respect to the broker process 200, but the information requested (e.g. a window handle), is directly relevant to the sandbox process 201, rather than the broker process 200 (i.e. the sandbox process 201 has an interface window, while the broker process 200 does not).

The reverse patch module 204 intercepts the API function call 202. This interception may be performed in several different manners as commonly known in the art, such as by using an operating system hook, Import Address Table (IAT) hooking, and the like. In some embodiments, the reverse patch module 204 executes alternate code in response to trapping the API function call 202. Such alternate code may be provided via a wrapper function within the reverse patch module 204 that then executes the same API call within the sandbox process 201 instead of the broker process 200. As such, the API call 206 properly executes within the sandbox process 201, and thus generates a result 208 representing the result of the call in reference to the sandbox process 201. In some embodiments, the result is a return value of the function. In some embodiments, the result of the function is contained within a field that is passed by reference with the API function. The result 208 then is then returned to the calling function within the reverse patch module 204. The reverse patch module 204 passes the return value 208 to the original calling API function 202 as the return value 210. If the result is passed by reference, the reverse patch module copies the result into a data structure passed by reference with the original API function call 202. In this manner the broker process 200 provides the proper result of the API call 202 with reference to the sandbox process 201. The reverse patch module 204 may be configured to trap any of a variety of API calls, including but not limited to GetActiveWindow, SetActiveWindow, GetGUIThreadInfo, GetFocus, GetLastActivePopup, GetNextWindow, GetParent, GetShellWindow, Get- TopWindow, and GetWindow. In this manner, the invention advantageously provides for a bidirectional broker process which can request information from the sandbox process in addition to carrying out tasks for the sandbox process which require a higher level of privilege. As such, the broker process provides a generic solution for proper API processing.

Figure 3:
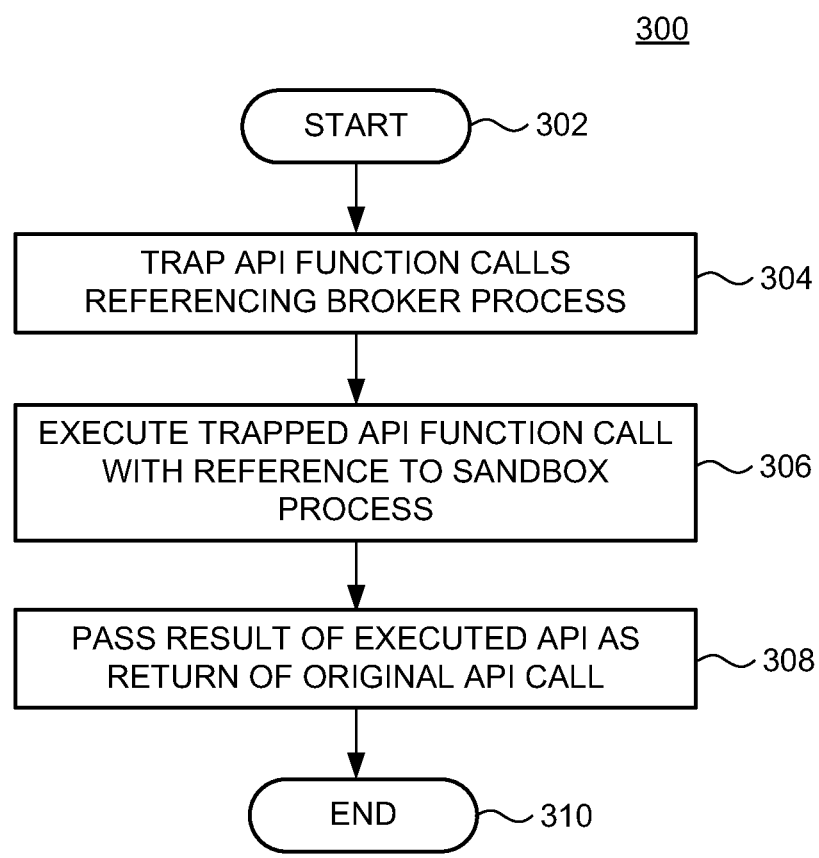
FIG. 3 is a flow diagram depicting a method for implementing reverse patching of API calls in a sandbox environment using a computer system such as the computer system described with respect to FIG. 1 according to one or more embodiments.

FIG. 3 is a high-level flow diagram illustrating a method 300 for implementing reverse patching of API calls in a sandbox environment. The method 300 represents one embodiment of an implementation of the reverse patch module 118 described with respect to FIGS. 1 and 2. The method 300 traps API calls that reference the broker process 114 and calls the same API call with reference to the sandbox process 116. The method 300 begins at step 302 and proceeds to step 304.

At step 304, the method 300 traps an API function call. As described above with respect to FIG. 2, the trapping may be performed with the use of operating system hooks, or other methods of trapping API function calls as known in the art. The method 300 then proceeds to step 306. At step 306, the method 300 executes the trapped API call, but in reference to the sandbox process rather than the broker process. For example, in one embodiment, in response to trapping the API call, the broker process executes a wrapper function that instructs the sandbox process to execute the same API function call, and then return the result of the function call to the broker process. After instructing the sandbox process to execute the API function call, the method 300 proceeds to step 308.

At step 308, the method 300 passes a result of the function call to the originator of the trapped API call. In this manner the originator of the trapped API call receives the same return result as if the call had been made to the proper application, the sandbox process. After returning the value to the originator of the trapped API call, the method 300 ends at step 310.

Example Computer System

Various embodiments of a system and method for implementing reverse patching of API calls in a sandbox environment as described herein may be executed on one or more computer systems, which may interact with various other devices. One such computer system is a computer system 400 illustrated by FIG. 4, which may in various embodiments implement any of the elements of functionality illustrated in FIGS. 1-3. In various embodiments, computer system 400 may be configured to implement reverse patching of API calls in a sandbox environment, as described above. While the illustrated system demonstrates the computer system 400 implementing reverse patching of API calls in a sandbox environment, the computer system 400 may be used to implement any other system, device, element, functionality or method of the above-described embodiments. In the illustrated embodiments, the computer system 400 may be configured to implement reverse patching of API calls in a sandbox environment as processor-executable program instructions 422 (e.g., program instructions executable by processor(s) 410a-410n) in various embodiments.

In the illustrated embodiment, the computer system 400 includes one or more processors 410a-410n coupled to a system memory 420 via an input/output (I/O) interface 430. The computer system 400 further includes a network interface 640 coupled to I/O interface 430, and one or more input/output devices 650, such as cursor control device 460, keyboard 470, and display(s) 480. In various embodiments, any of the components 460-480 may be utilized by application software such as for example, the reverse patch module 118 of FIG. 1 and the reverse patch module 204 of FIG. 2, for receiving input. In various embodiments, a user interface may be generated and displayed on the display 480. In some cases, it is contemplated that embodiments may be implemented using a single instance of the computer system 400, while in other embodiments multiple such systems, or multiple nodes making up the computer system 400, may be configured to host different portions or instances of various embodiments. For example, in one embodiment some elements may be implemented via one or more nodes of the computer system 400 that are distinct from those nodes implementing other elements. In another example, multiple nodes may implement the computer system 400 in a distributed manner.

In different embodiments, the computer system 400 may be any of various types of devices, including, but not limited to, a personal computer system, desktop computer, laptop, notebook, or notebook computer, mainframe computer system, handheld computer, workstation, network computer, a camera, a set top box, a mobile device, a consumer device, application server, or in general any type of computing or electronic device that is capable of having software installed.

In various embodiments, the computer system 400 may be a uniprocessor system including one processor 410a, or a multiprocessor system including several processors 410a-410n (e.g., two, four, eight, or another suitable number). Examples of common computer systems such as the computer system 400, include, but are not limited to, desktop PCs, smart phones, tablet computers, laptops, servers, mainframes, and the like. The processors 410a-410n may be any suitable processor capable of executing instructions. For example, in various embodiments the processors 410a-410n may be general-purpose or embedded processors implementing any of a variety of instruction set architectures (ISAs), such as the x86, PowerPC, SPARC, or MIPS ISAs, or any other suitable ISA. In multiprocessor systems, each of the processors 410a-410n may commonly, but not necessarily, implement the same ISA.

System memory 420 may be configured to store program instructions 422 and/or data 432 accessible by the processors 410a-410n. In various embodiments, the system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within the system memory 420. In other embodiments, program instructions and/or data may be received, sent or stored upon different types of computer-accessible media or on similar media separate from the system memory 420 or the computer system 400.

In one embodiment, the I/O interface 430 may be configured to coordinate I/O traffic between the processors 410a-410n, system memory 420, and any peripheral devices in the device, including the network interface 440 or other peripheral interfaces, such as the input/output devices 450, In some embodiments, the I/O interface 430 may perform any necessary protocol, timing or other data transformations to convert data signals from one components (e.g., system memory 420) into a format suitable for use by another component (e.g., processors 410a-410n). In some embodiments, the I/O interface 430 may include support for devices attached through various types of peripheral buses, such as a variant of the Peripheral Component Interconnect (PCI) bus standard or the Universal Serial Bus (USB) standard, for example. In some embodiments, the function of the I/O interface 430 may be split into two or more separate components, such as a north bridge and a south bridge, for example. Also, in some embodiments some or all of the functionality of the I/O interface 430, such as an interface to the system memory 420, may be incorporated directly into the processors 410a-410n.

The network interface 440 may be configured to allow data to be exchanged between the computer system 400 and other devices attached to a network (e.g., network 490), such as one or more external systems or between nodes of the computer system 400. In various embodiments, the network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The Input/output devices 450 may, in some embodiments, include one or more display terminals, keyboards, keypads, touchpads, scanning devices, voice or optical recognition devices, or any other devices suitable for entering or accessing data by one or more computer systems. Multiple input/output devices may be present in the computer system 400 or may be distributed on various nodes of the computer system 400. In some embodiments, similar input/output devices may be separate from the computer system 400 and may interact with one or more nodes of the computer system 400 through a wired or wireless connection, such as over the network interface 440.

In some embodiments, the illustrated computer system may implement any of the methods described above, such as the methods illustrated by the flowchart of FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The foregoing embodiments comprise a number of elements and/or modules that perform various functions as described. The elements and/or modules are exemplary implementations of means for performing their respective functions.

While the foregoing is directed to embodiments of the present invention, other and further embodiments of the invention may be devised without departing from the basic scope thereof, and the scope thereof is determined by the claims that follow.

The invention claimed is:

1. A computer implemented method, comprising:
identifying an API function call directed to a broker process, wherein a plurality of information requested by an originator is directly relevant to a sandbox process;
trapping the API function call directed to the broker process using a computer, wherein the API function call references the broker process, wherein the broker process is a process that executes one or more operations on the behalf of a sandbox process, and wherein the sandbox process has an insufficient permission level to execute the one or more operations;
passing the trapped API function call to the sandbox process using the computer;
executing the trapped API function call within the sandbox process to generate a result in reference to the sandbox process using the computer;
passing the result from the sandbox process to the broker process using the computer; and
passing the result from the broker process to the originator using the computer.

2. The computer implemented method of claim 1, further comprising:

executing a wrapper function within the broker process to call the trapped API function call with reference to the sandbox process.

3. The computer implemented method of claim 1, wherein the result comprises a return value or a value passed by reference.

4. The computer implemented method of claim 1, wherein the broker process executes with a higher privilege level than the sandbox process.

5. The computer implemented method of claim 1, wherein the API function call is a request for a user interface handle.

6. The computer implemented method of claim 1, wherein the broker process and the sandbox process communicate via a shared pipe.

7. The computer implemented method of claim 1, wherein the API function call is trapped using a hook.

8. A non-transitory computer readable storage medium for storing software that, when executed by a computing system, causes a computing system to perform a method that comprises:
   identifying an API function call directed to a broker process, wherein a plurality of information requested by an originator is directly relevant to a sandbox process;
   trapping the API function call directed to the broker process using a computer, wherein the API function call references the broker process, wherein the broker process is a process that executes one or more operations on the behalf of a sandbox process, and wherein the sandbox process has an insufficient permission level to execute the one or more operations;
   passing the trapped API function call to the sandbox process;
   executing the trapped API function call within the sandbox process to generate a result in reference to the sandbox process;
   passing the result from the sandbox process to the broker process; and
   passing the result from the broker process to the originator.

9. The non-transitory computer readable storage medium of claim 8, further comprising:
   executing a wrapper function within the broker process to call the trapped API function call with reference to the sandbox process.

10. The non-transitory computer readable storage medium of claim 8, wherein the result comprises a return value or a value passed by reference.

11. The non-transitory computer readable storage medium of claim 8, wherein the broker process executes with a higher privilege level than the sandbox process.

12. The non-transitory computer readable storage medium of claim 8, wherein the API function call is a request for a user interface handle.

13. The non-transitory computer readable storage medium of claim 8, wherein the broker process and the sandbox process communicate via a shared pipe.

14. The non-transitory computer readable storage medium of claim 8, wherein the API function call is trapped using a hook.

15. Apparatus for implementing a reverse patch architecture for API calls comprising:
   a computer for generating an API function call; and
   the computer configured to identify the API function call directed to a broker process, wherein a plurality of information requested by an originator is directly relevant to a sandbox process, trap the API function call wherein the API function call references a broker process that executes one or more operations on the behalf of a sandbox process, pass the trapped API function call to the sandbox process, execute the trapped API function call with reference to the sandbox process to generate a result, pass the result from the sandbox process to the broker process, and return the result from the broker process to the means for generating the API function call, wherein the sandbox process has an insufficient permission level to execute the one or more operations.

16. The apparatus of claim 15, wherein the computer is further configured to execute a wrapper function within the broker process to call the trapped API function call with reference to the sandbox process.

17. The apparatus of claim 15, wherein the result comprises a return value or a value passed by reference.

18. The apparatus of claim 15, wherein the computer is further configured with a broker process executing with a higher privilege level than a sandbox process.

19. The apparatus of claim 15, wherein the API function call is a request for a user interface handle.

20. The apparatus of claim 18, wherein the broker process and the sandbox process communicate via a shared pipe.

* * * * *